S. L. SIMPSON.
FIBER TIRE FOR VEHICLE WHEELS.
APPLICATION FILED MAY 4, 1910.
974,714.
Patented Nov. 1, 1910.
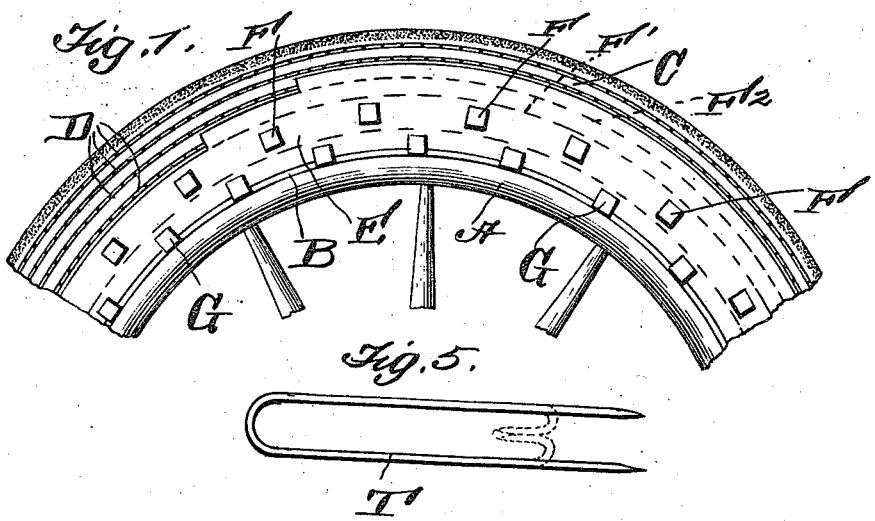
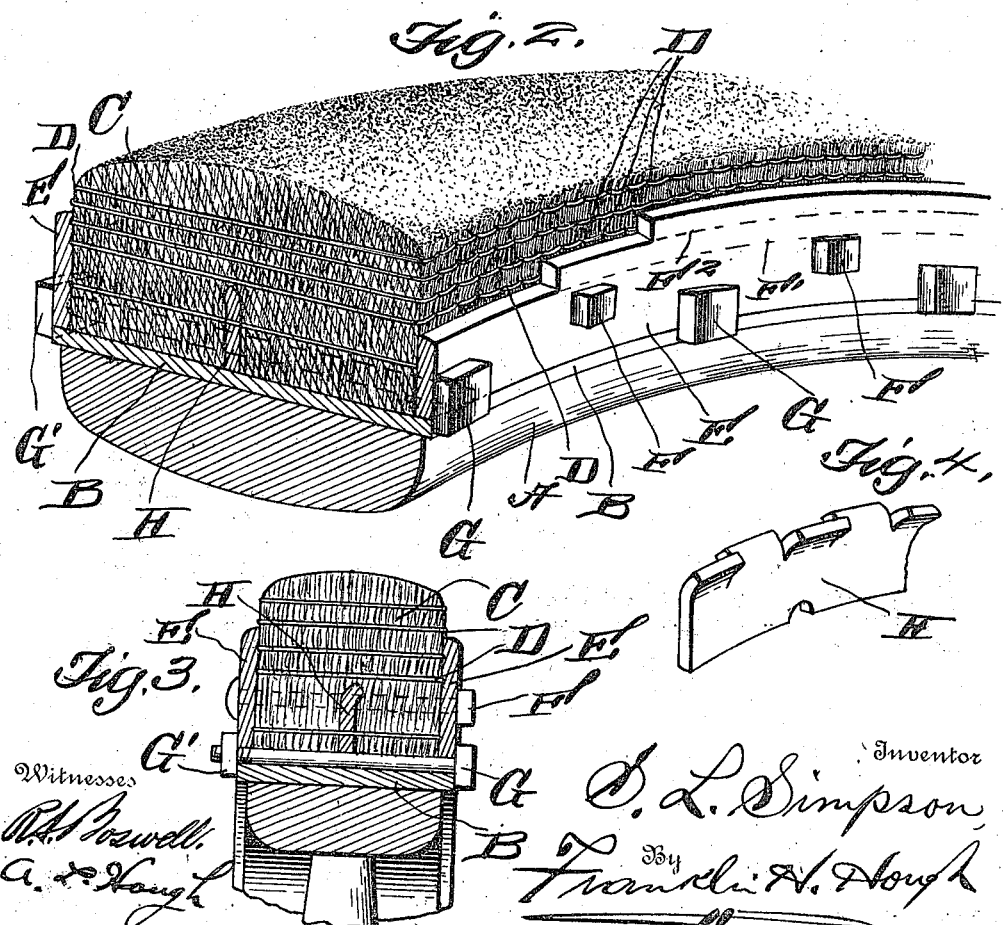

UNITED STATES PATENT OFFICE.

SELDEN L. SIMPSON, OF CLEVELAND, OHIO, ASSIGNOR TO THE SIMPSON SPECIALTY COMPANY, OF CLEVELAND, OHIO, A CORPORATION OF OHIO.

FIBER TIRE FOR VEHICLE-WHEELS.

974,714.   Specification of Letters Patent.   Patented Nov. 1, 1910.

Application filed May 4, 1910. Serial No. 559,328.

*To all whom it may concern:*

Be it known that I, SELDEN L. SIMPSON, a citizen of the United States, residing at Cleveland, in the county of Cuyahoga and State of Ohio, have invented certain new and useful Improvements in Fiber Tires for Vehicle-Wheels; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in fiber tires for vehicle wheels and the purpose of the invention is to produce a compact tire of fiber, the outer ends of which are presented as a tread surface, the fiber being reduced to a compact form by hydraulic pressure and held by clamping plates designed to be detachably held to a metallic tire upon the rim of a wheel.

The invention comprises further a fiber tire for wheels having concentric rows of stitching, the fiber being confined by clamping plates secured to a metallic tire upon the rim of the wheel, the plates being adapted to be cut away adjacent to the rows of stitching to compensate for wear upon the tread surface of the tire.

The invention comprises various other details of construction and combinations and arrangements of parts which will be hereinafter fully described and then specifically defined in the appended claims.

I illustrate my invention in the accompanying drawings, in which:—Figure 1 is an elevation showing a portion of one of said clamping plates cut away. Fig. 2 is an enlarged detail perspective view of a portion of the tire, parts being cut away to better illustrate features of the invention. Fig. 3 is a transverse sectional view through the tire and rim of a wheel. Fig. 4 is an enlarged detail view of a section of an anchorage plate, and Fig. 5 is a detail section of a modified means of holding the fiber in a compact form.

Reference now being had to the details of the drawings by letter, A designates an ordinary rim of the vehicle wheel having the usual metallic tire B thereon and about the circumference of which it is my purpose to apply the fiber tire C which is made up of any form of material, such as Manila or sisal hemp with the strands of the fiber radially disposed or on end so that their outer ends will form the tread surface thereof. The fiber, prior to its being reduced to form for use, is preferably treated with any suitable material, such as creosote, tar or any other substance which will have a tendency to preserve the fiber and make the same water proof, after which the mass of fiber is subjected to hydraulic pressure to reduce it to a compact form. Rows of stitching D are formed in concentric series through the tire after having been reduced to a compact form, which stitching may be of any suitable material, such as wire, wax threads or other material, the purpose of the stitching being to hold the outer ends of the fiber adjacent to the tread surface, in a compact form and which will have a tendency to prevent spreading of the fiber as would likely be the case without the stitching.

After the tire has been compressed hydraulically and stitched, the retaining rings E, preferably of metal, are placed one against each opposite side of the tire with the inner edge of said rings resting upon the circumference of the tire B, said rings or plates E being held in clamping relation against the opposite sides of the tire by means of the rivets F. In order to hold the rings in secure clamping relation with the tire, hydraulic pressure is applied to the outer faces thereof while the rivets F are inserted through the rings or plates and the tire and, after the ends of the rivets are upset or clamped, said plates will serve to hold the tire securely in a compact form. Said rings are scored at locations designated by letters F and F′ at suitable locations from their outer circumferences to indicate sections which are adapted to be cut away by placing the wheel in a lathe and subjecting the rings to cutting tools for the purpose of reducing the diameters of the rings to compensate for the wear of the tire. Said score lines F and F′ are spaced apart distances about equal to the distance between the concentric rows of stitching so that, when the outer circumference of the fibrous tire is worn away to a location adjacent to the outer circumferences of the rings, the life of the tire may be prolonged by cutting away a section of the ring. When sections of the tire are worn away, it will be observed that the next inner row of stitching will serve to hold the outer ends of the fiber in a compact form and from spreading until other sections of the rings are cut away to further compensate for wear. Said compression rings E are provided at intervals with registering apertures adapted to receive the bolts G which are passed through the fiber tire and also through grooves in the anchorage ring H, and nuts G' are fitted to the threaded ends of the bolts G. It will be noted that the heads of the bolts G are adapted to bear against one edge of the tire B while the retaining nuts G' upon the other ends of the bolts bear frictionally against the opposite edge of the tire B and serve as means to securely hold the fiber tire in place about the rim of the wheel. Said anchorage ring H passes about and engages the circumference of the tire B at any suitable location, preferably midway its width, and has its outer marginal edge cut to form a series of wings or lugs which are curved laterally in different directions and adapted to engage the fiber and serve as a secure means for anchoring the inner portion of the fibrous tire in place. Said anchorage ring is adapted especially for use where tires of unusual width are used and adapted to sustain greater loads upon which tires heavy strain would come.

From the foregoing, it will be noted that, by the provision of a tire made as shown and described, as the tread surface of the fiber becomes worn, uniform sections of the rings may be cut away to compensate for the wear, the stitching serving to hold the outer tread surface of the tire adjacent to the marginal edges of the rims and, where the greatest strains come upon the fiber, in a compact form and preventing the fiber from spreading.

In Fig. 5 of the drawings, I have shown a slight modification of a stapling means for holding the fiber in a compact form and which may be utilized in place of the stitching, if desired, and in which figure the staples, designated by letter T, are independent one of another.

From the construction shown, it will be noted that the fibrous tire may be easily and quickly removed from the rim of the wheel when desired for any purpose by simply removing the nuts from the bolts G, allowing the fibrous tire and the anchorage plate to be removed together with the bolts, as will be readily understood.

What I claim to be new is:—

1. A vehicle tire made up of fiber, the outer ends of which form a tread surface, reduced to a compact form and having concentric rows of stitching therein, clamping rings embracing the opposite sides of the tire and concentrically scored, means for fastening said rings to the fibrous tire, a rim, a metallic tire about the circumference thereof, an anchorage ring about said metallic tire, the outer marginal edge of said anchoring ring having adjacent portions at the edge thereof curved oppositely and embedded within the fiber tire, and means for holding said clamping rings to said metallic tire.

2. A vehicle tire made up of fiber, the outer ends of which form a tread surface, reduced to a compact form and having concentric rows of stitching therein. a rim, a metallic tire about the latter, clamping rings, concentrically scored to correspond to the rows of stitching of the fibrous tire, the scores being parallel with the concentric rows of stitching, the inner marginal edges of the rings engaging the circumference of said metallic tire, bolts passing through said rings and fibrous tire, the heads of the bolts engaging one of the marginal edges of the metallic tire, and nuts upon the threaded ends of the bolts engaging the other edge of the latter.

In testimony whereof I hereunto affix my signature in the presence of two witnesses.

SELDEN L. SIMPSON.

Witnesses:
 FRANKLIN H. HOUGH.
 A. L. HOUGH.